US011378185B2

(12) United States Patent
Keller et al.

(10) Patent No.: US 11,378,185 B2
(45) Date of Patent: Jul. 5, 2022

(54) PARKING MECHANISM AND METHOD OF OPERATION THEREOF

(71) Applicant: Dana Heavy Vehicle Systems Group, LLC, Maumee, OH (US)

(72) Inventors: Robert D. Keller, Haskins, OH (US); Ned W. Wright, Toledo, OH (US); Aaron D. Gries, Perrysburg, OH (US); Robert L. Vailliencourt, Wauseon, OH (US); Brian V. Knapke, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 195 days.

(21) Appl. No.: 16/599,539

(22) Filed: Oct. 11, 2019

(65) Prior Publication Data
US 2021/0108720 A1    Apr. 15, 2021

(51) Int. Cl.
*F16H 63/34* (2006.01)
*F16H 63/18* (2006.01)
*F16H 61/24* (2006.01)

(52) U.S. Cl.
CPC ......... *F16H 63/3433* (2013.01); *F16H 63/18* (2013.01); *F16H 63/3416* (2013.01); *F16H 63/3425* (2013.01); *F16H 2061/243* (2013.01)

(58) Field of Classification Search
CPC .. F16H 63/34; F16H 63/3416; F16H 63/3425; F16H 63/3433; F16H 63/3458; F16H 63/3483; F16H 55/0806; F16H 2061/243; F16H 63/18; B60T 1/005; G05B 2219/35022; G05B 2219/35035; Y10T 74/19972
See application file for complete search history.

(56) References Cited

U.S. PATENT DOCUMENTS

| | | | | |
|---|---|---|---|---|
| 1,412,889 A | * | 4/1922 | O'Brien | F16H 55/0806 74/462 |
| 2,964,135 A | * | 12/1960 | Sand | B60T 1/005 188/69 |
| 3,601,231 A | * | 8/1971 | Kolacz | B60T 1/005 188/69 |
| 4,369,867 A | * | 1/1983 | Lemieux | B60T 1/005 188/31 |
| 4,413,712 A | * | 11/1983 | Richard | B60T 1/005 188/82.7 |
| 5,269,195 A | * | 12/1993 | Kitagawara | F16H 63/3416 74/411.5 |

\* cited by examiner

*Primary Examiner* — Richard M Lorence
(74) *Attorney, Agent, or Firm* — McCoy Russell LLP

(57) ABSTRACT

A parking mechanism for use in a vehicle and method of operation thereof. The parking mechanism includes one or more actuation mechanisms, a parking pawl and a parking gear. At least a portion of the one or more actuation mechanisms are drivingly connected to at least a portion of a cam. The parking pawl has one or more parking pawl teeth extending therefrom that are selectively engagable with at least a portion of one or more parking gear teeth extending from an outer surface of a body portion of the parking gear. The parking pawl also includes a parking pawl pin aperture having a size and shape needed to receive and/or retain at least a portion of a parking pawl pin therein.

16 Claims, 5 Drawing Sheets

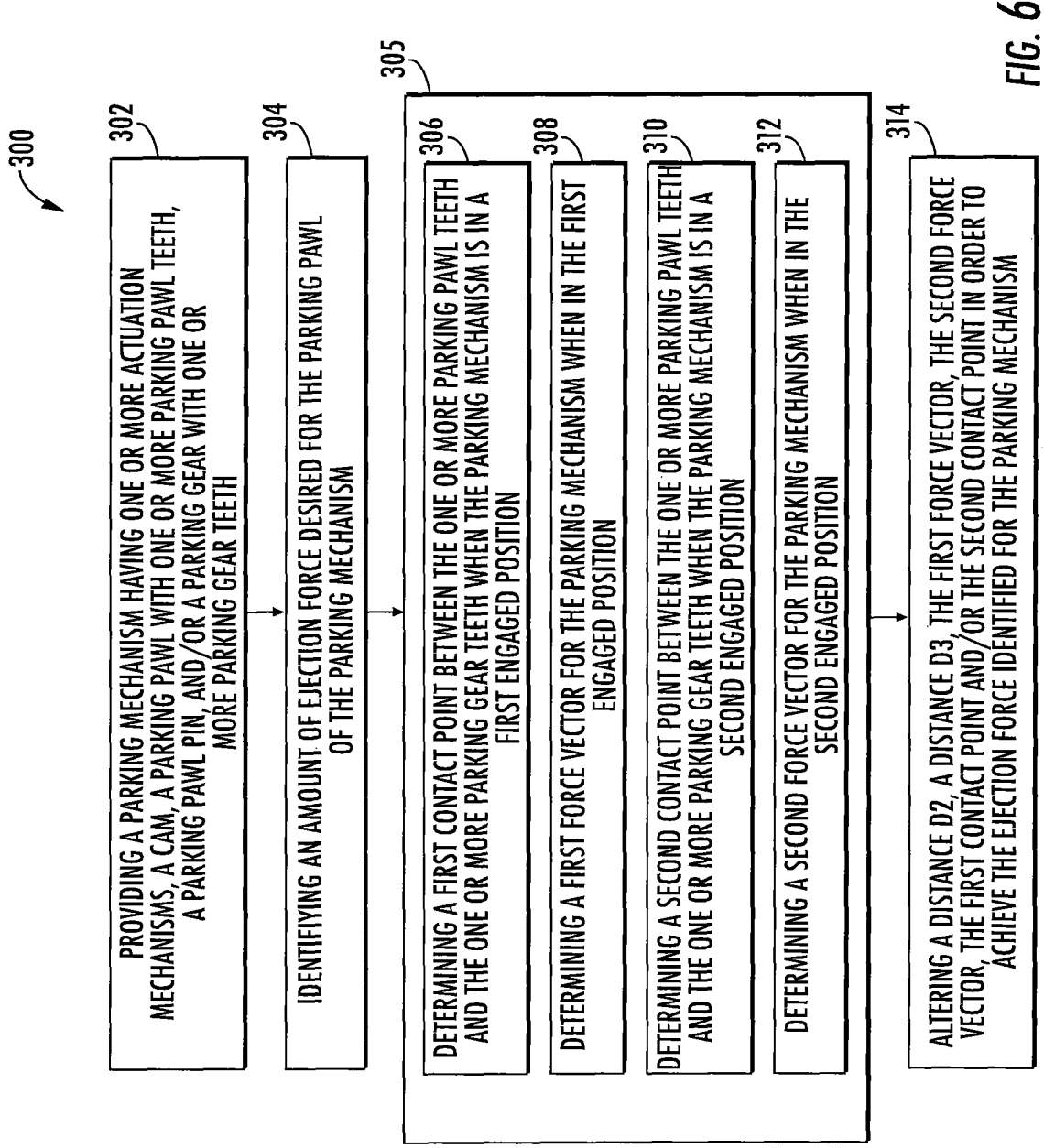

PARKING MECHANISM AND METHOD OF OPERATION THEREOF

FIELD OF THE DISCLOSURE

The present disclosure relates to a parking mechanism for use in a vehicle. Additionally, the present disclosure related to a method of operating a parking mechanism.

BACKGROUND OF THE DISCLOSURE

Various vehicle parking mechanisms are known in the art. The conventional parking mechanism includes a parking pawl that is engages a parking gear. The parking gears that are conventionally used within the industry have a plurality of parking gear teeth extending outward from an outer surface of the parking gear. The plurality of parking gear teeth of the conventional parking gear have a parking pawl engagement profile including in order a first flat surface, a second flat surface, and a third flat surface. The first and second flat surfaces extend outward from a body portion of the parking gear and are parallel to each other. Additionally, the first and third flat surfaces of the parking pawl engagement profile of the plurality of parking gear teeth of the conventional parking gear extend perpendicular to a tangent of the body portion of the parking gear. The second flat surface is connected to an end of the first and third flat surfaces opposite the body portion of the parking gear and extends between the first and third flat surfaces of the plurality of parking gear teeth. When the parking pawl is engaged with the parking gear, the parking pawl is engaged with the first or the second flat surface of the plurality of parking gear teeth.

As a result of the overall shape of the parking pawl engagement profile of the plurality of parking pawl teeth, the conventional parking mechanism is prone to experiencing a lock-up or binding condition. In particular, the lock-up or binding condition experienced by the parking mechanism occurs when the vehicle is parked on a hill and therefore subjects a load on the parking mechanism due to the grade of the road in which the vehicle is parked. The lock-up or binding condition of the parking mechanism requires a relatively large amount of force to drive the parking pawl out of engagement with the parking gear. As a result, the conventional parking mechanisms require a relatively large motor to provide the amount of force needed to drive the parking pawl out of engagement with the parking gear. This increases the overall packaging size of the parking mechanism, the overall weight of the parking mechanism, and the overall costs associated with the parking mechanism of the vehicle.

It would therefore be advantageous to develop a parking mechanism that does not experience a lock-up or binding condition, has a reduced packaging size, has a relatively small actuator or motor, has a reduced overall weight, that is easier to manufacturer, and has a reduced overall cost. Additionally, it would be advantageous to develop a single parking mechanism that is capable of being used in a wide variety of vehicle applications, in a wide variety of vehicle locations, and on a wide variety of vehicle types and/or classes.

Additionally, it would be advantageous to develop a method of using a parking mechanism that will allow the parking mechanism to be used in a wide variety of vehicle applications, in a wide variety of vehicle locations, and on a wide variety of vehicle types and/or classes.

SUMMARY OF THE DISCLOSURE

A parking mechanism for use in a vehicle and method of operation thereof. The parking mechanism includes one or more actuation mechanisms, a parking pawl and a parking gear. At least a portion of the one or more actuation mechanisms are drivingly connected to at least a portion of a cam. The parking pawl has one or more parking pawl teeth extending therefrom that are selectively engagable with at least a portion of one or more parking gear teeth extending from an outer surface of a body portion of the parking gear. The parking pawl also includes a parking pawl pin aperture having a size and shape needed to receive and/or retain at least a portion of a parking pawl pin therein.

According to the previous aspect of the disclosure, the one or more actuation mechanisms may one or more actuators one or more electric motors, one or more pneumatic actuators, and/or one or more hydraulic actuators.

According to any one of the previous aspects of the disclosure, one or more actuation mechanisms may be directly or indirectly connected to at least a portion of the cam.

According to any one of the previous aspects of the disclosure, at least a portion of one or more biasing members may be connected to at least a portion of the parking pawl and the one or more biasing members may aid in selectively transitioning the parking pawl out of engagement with the parking gear.

According to any one of the previous aspects of the disclosure, the parking mechanism may have a disengaged position, a first engaged position, and/or a second engaged position. When in the disengaged position, the parking pawl may not engaged with the parking gear. Additionally, when in the first engaged position, at least a portion of the one or more parking pawl teeth of the parking pawl may be engaged with at least a portion of the one or more parking gear teeth of the parking gear. Furthermore, when in the second engaged position, at least a portion of the one or more parking pawl teeth of the parking pawl may be engaged with at least a portion of the one or more parking gear teeth of the parking gear.

According to any one of the previous aspects of the disclosure, when in the first engaged position, the parking mechanism may have a first force vector and when in a second engaged position, the parking mechanism may have a second force vector.

According to any one of the previous aspects of the disclosure, the first force vector of the parking mechanism may extend from a first contact point between the one or more parking gear teeth of the parking pawl and the one or more parking gear teeth of the parking gear toward the parking pawl pin of the parking mechanism. The second force vector of the parking mechanism may extend from a second contact point between the one or more parking gear teeth of the parking pawl and the one or more parking gear teeth of the parking gear toward the parking pawl pin.

According to any one of the previous aspects of the disclosure, the first force vector of the parking mechanism may be disposed a distance D2 from a center C1 of the parking pawl pin and the second force vector of the parking mechanism may be disposed a distance D3 from the center C1 of the parking pawl pin. The distance D2 may be measured from the center C1 of the parking pawl pin to a first point P1 where the first force vector extends through the parking pawl pin and the distance D3 may be measured from the center C1 of the parking pawl pin to a second point P2 where the second force vector extends through the parking pawl pin.

According to any one of the previous aspects of the disclosure, the distance D2 may be substantially equal to the distance D3.

According to any one of the previous aspects of the disclosure, the first force vector of the parking mechanism may extend above a center C1 of the parking pawl pin and the second force vector of the parking mechanism may extend below the center C1 of the parking pawl pin.

According to any one of the previous aspects of the disclosure, the one or more parking gear teeth of the parking gear may have cross-sectional profile or shape including, in order, a first portion, a second portion, a third portion, a fourth portion, a fifth portion, a sixth portion, and/or a seventh portion.

According to any one of the previous aspects of the disclosure, the first portion and the seventh portion of the cross-sectional profile or shape of the one or more parking gear teeth of the parking gear may extend outward away from the outer surface of the body portion of the parking gear. Additionally, the first portion and the seventh portion of the cross-sectional profile or shape of the one or more parking gear teeth may have a substantially fillet shape, a substantially arcuate shape, a substantially radiused shape, and/or a substantially concave shape.

According to any one of the previous aspects of the disclosure, the second and the sixth portions of the cross-sectional profile or shape of the one or more parking gear teeth may extend outward away from the body portion of the parking gear from an end of the first and seventh portions of the cross-sectional profile or shape of the one or more parking gear teeth respectively. The second portion and the sixth portion of the cross-sectional profile or shape of the one or more parking gear teeth may have a substantially involute or a substantially evolvent shape that is derived from a base circle diameter of the parking gear.

According to any one of the previous aspects of the disclosure, the transition of the first portion to the second portion and the transition from the seventh portion to the sixth portion of the cross-sectional profile or shape of the one or more parking gear teeth may be disposed along a substantially continuous radius R4 from a theoretical center TC2 of the parking gear.

According to any one of the previous aspects of the disclosure, the radius R4 defining the base circle diameter may be larger than a radius R3 of the outer surface of the body portion of the parking gear defining a root circle diameter of the parking gear.

According to any one of the previous aspects of the disclosure, the parking mechanism may have a first engaged position and a second engaged position. The second portion and the sixth portion of the cross-sectional shape or profile of the one or more parking gear teeth have a substantially evolvent shape that is derived from a base circle diameter of the parking gear. When in the first engaged position, at least a portion of the one or more parking pawl teeth of the parking pawl may be engaged with at least a portion of the second portion of the cross-sectional profile or shape of the one or more parking gear teeth at a location at or near the transition from the first portion to the second portion of the cross-sectional profile or shape of the one or more parking gear teeth. When in the second engaged position, at least a portion of the one or more parking pawl teeth may be engaged with at least a portion of the sixth portion of the cross-sectional profile or shape of the one or more parking gear teeth at a location at or near the transition from the seventh portion to the sixth portion of the cross-sectional profile or shape of the one or more parking gear teeth.

According to any one of the previous aspects of the disclosure, the parking mechanism may have a first engaged position and a second engaged position. When in the first engaged position, at least a portion of the one or more parking pawl teeth of the parking pawl may be engaged with at least a portion of a portion of the cross-sectional profile or shape of the one or more parking gear teeth having a substantially involute or a substantially evolvent shape at a location near the body portion of the parking gear. When in the second engaged position, at least a portion of the one or more parking pawl teeth may be engaged with at least a portion of an additional portion of the cross-sectional profile or shape of the one or more parking gear teeth having a substantially involute or a substantially evolvent shape at a location near the body portion of the parking gear.

According to any one of the previous aspects of the disclosure, the parking mechanism may have a first engaged position and a second engaged position. When in the first engaged position, at least a portion of the one or more parking pawl teeth may be engaged with at least a portion of a portion of the parking gear having a substantially involute or a substantially evolvent shape that is derived from a base circle diameter of the parking gear. When in the second engaged position, at least a portion of the one or more parking pawl teeth may be engaged with at least a portion of an additional portion of the parking gear having a substantially involute or a substantially evolvent shape that is derived from a base circle diameter of the parking gear.

According to any one of the previous aspects of the disclosure, the one or more parking pawl teeth of the parking pawl may have a cross-sectional profile or shape comprising first substantially straight portion, a first transition portion, a second substantially straight portion, a second transition portion, and/or a third substantially straight portion.

According to any one of the previous aspects of the disclosure, the parking mechanism may have a first engaged position and a second engaged position. When in the first engaged position, at least a portion of the second transition portion and/or the third substantially straight portion of the cross-sectional profile or shape of the one or more parking pawl teeth may be in direct contact with at least a portion of a portion of the one or more parking gear teeth having a substantially involute or a substantially evolvent shape that is derived from a base circle diameter of the parking gear. When in the second engaged position, at least a portion of the first substantially straight portion and/or the first transition portion of the cross-sectional profile or shape of the one or more parking pawl teeth may be in direct contact with at least a portion of an additional portion of the one or more parking gear teeth having a substantially involute or a substantially evolvent shape that is derived from a base circle diameter of the parking gear.

The present disclosure also relates to a method of operating or using a parking mechanism. The method includes providing a parking mechanism with one or more actuation mechanisms, a cam, a parking pawl having one or more parking pawl teeth, a parking pawl pin, and/or a parking gear having one or more parking gear teeth. Once the parking mechanism has been provided, an amount of ejection force for the parking mechanism may be identifying. After the amount of ejection force has been identified, a first contact point, a second contact point, a first force vector, a second force vector, a base circle diameter (BCD), a distance D2, and/or a distance D3 may be determined to achieve the ejection force identified. The first contact point may be between the one or more parking pawl teeth and the one or more parking gear teeth when the parking mechanism is in a first engaged position and the second contact point may be between the one or more parking pawl teeth and the one or more parking gear teeth in a second engaged position. Additionally, the first and second force vectors may extend from the first and second contact points toward the parking pawl pin.

According to the previous aspect of the disclosure, the distance D2, the distance D3, the BCD, the first force vector, the second force vector, the first contact point, and/or the second contact point may be altered in order to achieve the ejection force identified for the parking mechanism. The distances D2 and D3 may be measured from a center of the parking pawl pin to a first and second point where the first and second force vectors extend through or contact the parking pawl pin of the parking mechanism.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 6 is a flow chart illustrating the method of using the parking mechanism illustrated in FIGS. 1-5 of the disclosure.

DETAILED DESCRIPTION OF THE DISCLOSURE

It is to be understood that the device and/or method described herein may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the parking mechanism disclosed herein may be used in automotive, off-road vehicle, all-terrain vehicle, construction, structural, marine, aerospace, locomotive, military, machinery, robotic and/or consumer product applications. Additionally, as a non-limiting example, the parking mechanism disclosed herein may also be used in passenger vehicle, electric vehicle, hybrid vehicle, commercial vehicle, autonomous vehicles, semi-autonomous vehicles and/or heavy vehicle applications.

Figure 1:
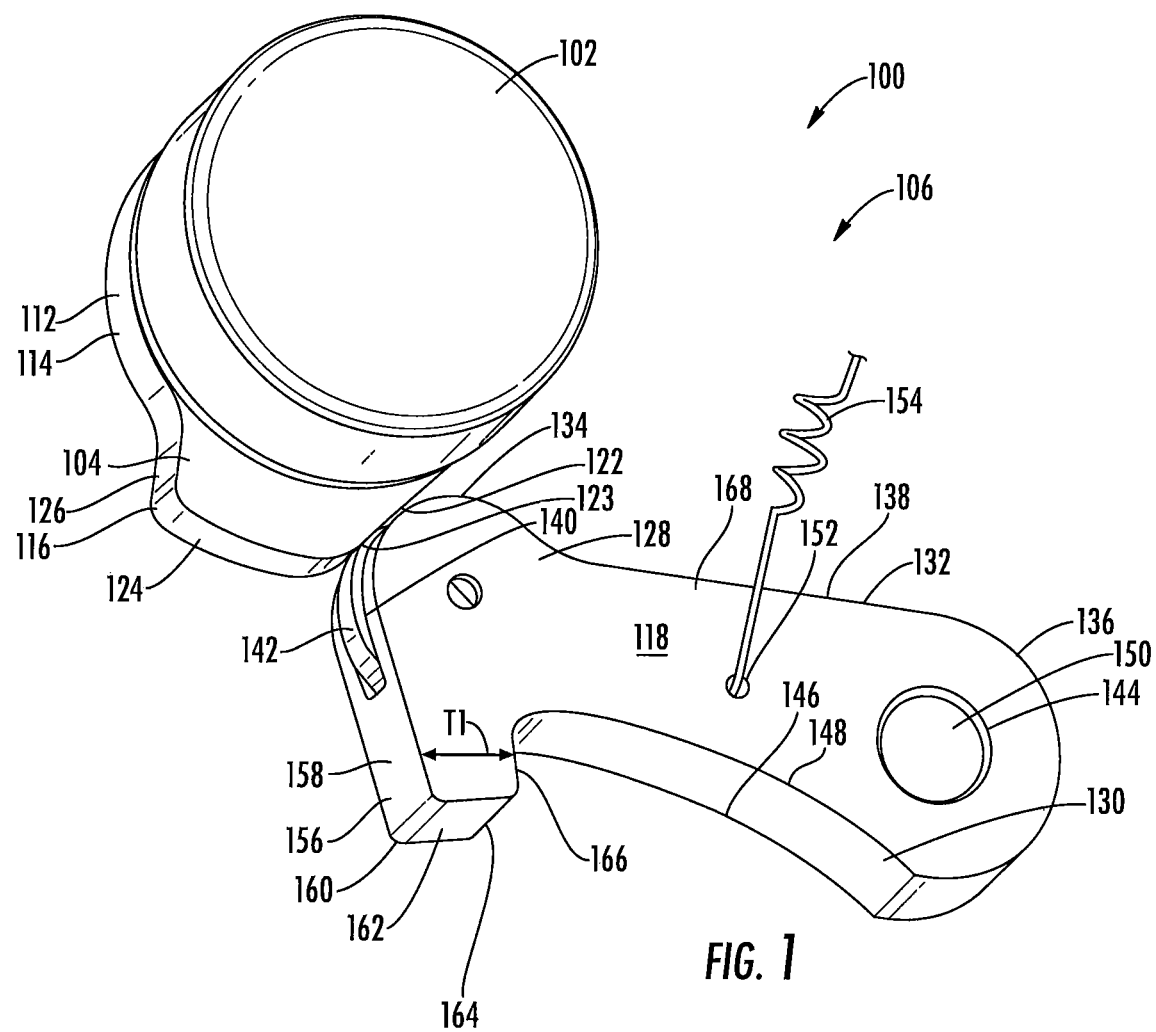
FIG. 1 is a schematic side perspective view of a portion of a parking mechanism.

FIGS. 1-4 provide a schematic illustration of a parking mechanism 100 according to an embodiment of the disclosure. As best seen in FIG. 1 of the disclosure and as a non-limiting example, the parking mechanism 100 may include one or more actuation mechanisms 102 that is drivingly connected to at least a portion of a cam 104. The power created by the one or more actuation mechanisms 102 may be used in order to aid in selectively transitioning the parking mechanism 100 between a disengaged position 106 illustrated in FIGS. 1 and 2, a first engaged position 108 illustrated in FIG. 3, and a second engaged position 110 illustrated in FIG. 4 of the disclosure. It is within the scope of this disclosure and as a non-limiting example that the one or more actuation mechanisms 102 may be one or more actuators, one or more electric motors, one or more pneumatic actuators, and/or one or more hydraulic actuators. Additionally, it is within the scope of this disclosure and as non-limiting example that the one or more actuation mechanisms 102 may be directly or indirectly connected to at least a portion of the cam 104 of the parking mechanism 100. In accordance with the embodiment where the one or more actuation mechanisms 102 are indirectly drivingly connected to at least a portion of the cam 104, the parking mechanism 100 may include a gearing arrangement (not shown) that is capable of transferring the rotational power generated by the one or more actuation mechanisms 102 to the cam 104.

As best seen in FIG. 1 of the disclosure and as a non-limiting example, the cam 104 may include a body portion 112 having an outer peripheral surface 114. The outer peripheral surface 114 of the body portion 112 of the cam 104 may be substantially cylindrical in shape. As a result, it is within the scope of this disclosure and as a non-limiting example that the substantially cylindrical shape of the outer periphery 114 of the body portion 112 of the cam 104 may be defined by a substantially continuous radius R1 (not shown) from a theoretical center TC1 (not shown) of the body portion 112 of the cam 104.

One or more protruding portions 116 may extend outward from at least a portion of the outer peripheral surface 112 of the body portion 112 of the cam 104. The one or more protruding portions 116 on the outer peripheral surface 114 of the cam 104 may be of a size and shape needed to selectively drive a parking pawl 118 into engagement with a parking gear 120 of the parking mechanism 100. It is within the scope of this disclosure and as a non-limiting example that the first engaged position 108 of the parking mechanism 100 may be in a first rotational direction of the parking gear 120 and the second engagement position 110 may be in a second rotational position of the parking gear 120 opposite the first rotational position.

In accordance with the embodiment illustrated in FIG. 1 of the disclosure and as a non-limiting example, the one or more protruding portions 116 of the cam 104 may include a ramped portion 122, a first transition portion 123, an engagement portion 124, and/or a second transition portion 126. The ramped portion 122 of the one or more protruding portions 116 may extend outward from the outer periphery 114 of the body portion 112 of the cam 104 to an end of the first transition portion 123 opposite the locking portion 124 of the one or more protruding portions 116. It is within the scope of this disclosure and as a non-limiting example that the ramped portion 122 of the one or more protruding portions may be substantially straight and/or may extend substantially tangentially relative to the outer peripheral surface 114 of the cam 104. As a head 128 of the parking pawl 118 transitions along the ramped portion 122, the head 128 of the parking pawl 118 is driven toward the parking gear 120 thereby selectively transitioning the parking mechanism 100 from the disengaged position 106 to the first and/or second engagement positions 108 and/or 110.

According to the embodiment illustrated in FIG. 1 and as a non-limiting example, the first transition portion 123 of the one or more protruding portions 116 provides a transition from the ramped portion 122 to the engagement portion 124. As best seen in FIG. 1 of the disclosure and as a non-limiting example, the first transition portion 123 may extend from an end of the ramped portion 122 opposite the body portion 112 of the cam 104 toward an end of the engagement portion 124. It is within the scope of this disclosure and as a non-limiting example that the first transition portion 123 of the one or more protruding portions 116 of the cam 104 may be substantially arcuate in shape.

As best seen in FIG. 1 and as a non-limiting example, the engagement portion 124 of the one or more protruding portions 116 may be the outermost surface of the one or more protruding portions 116 of the cam 104. When the head 128 of the parking pawl 118 is in contact with the engagement portion 124 of the one or more protruding portions 116, the parking pawl 118 may be in the first and/or second engagement portion 108 and/or 110 or may be in a blocked condition (not shown). It is within the scope of this disclosure and as a non-limiting example that the engagement portion 124 may be substantially arcuate in shape. As a non-limiting example, the engagement portion 124 of the one or more protruding portions 116 may be defined by a substantially constant radius R2 (not shown) from the theoretical center TC1 (not shown) of the cam 104 of the parking mechanism 100. By providing the engagement portion 124 of the one or more protruding portions 116 with the substantially continuous radius R2 (not shown), it aids in ensuring that the parking pawl 118 remains in substantially the same position at all times when the parking mechanism 100 is in the first and/or second engagement portions 108 and/or 110 illustrated in FIGS. 3 and 4 of the disclosure.

The second transition portion 126 of the one or more protruding portions 116 of the cam 104 extends inward from an end of the engagement portion 124 opposite the first transition portion 123. The end of the second transition portion 126, opposite the engagement portion 124, connects the one or more protruding portions 116 to the outer peripheral surface 114 of the body portion 112 of the cam 104. As the head 128 of the parking pawl 118 transitions along the second transition portion 126 of the one or more parking gear teeth 174, the parking pawl 118 is allowed to transition from the first and/or second engagement positions 108 and/or 110 to the disengagement position 106 illustrated in FIGS. 1 and 2 of the disclosure.

In accordance with an alternative embodiment of the disclosure and as a non-limiting example, the cam 104 may be driven in a reverse direction by the one or more actuation mechanisms 102 in order to selectively transition the parking mechanism 100 from the first and/or second engagement positions 108 and/or 110 to the disengagement position 106. The reverse direction may be defined as the direction opposite the direction needed to transition the parking mechanism 100 from the disengaged position 106 to the first and/or second engagement positions 108 and/or 110. According to this embodiment of the disclosure and as a non-limiting example, the head 128 of the parking pawl 118 may be allowed to transition from the engagement portion 124, to the first transition portion 123, and then down the ramped portion 122 of the one or more protruding portions 116. As the head 128 of the parking pawl 118 transitions along the first transition portion 123 and/or the ramped portion 122 of the cam 104, the parking mechanism 100 is selectively transitioned from the first and/or second engagement positions 108 and/or 110 to the disengaged position 106 described and illustrated herein.

As best seen in FIG. 1 of the disclosure and as a non-limiting example, the parking pawl 118 has an inner surface 130, an outer surface 132, a first end portion 134, a second end portion 136, and an intermediate portion 138 interposed between the first and second end portions 134 and 136. One or more roller receiving portions 140 may extend inward from the outer surface 138 of the first end portion 134 of the parking pawl 118 of the parking mechanism 100. The one or more roller receiving portions 140 in the first end portion 134 of the parking pawl 118 may be of a size and shape to receive and/or retain at least a portion of one or more rolling elements 142 therein. The one or more rolling elements 142 may be used in order to reduce the overall amount of friction between the parking pawl 118 and the cam 104 when the parking mechanism 100 is in operation. It is therefore within the scope of this disclosure and as a non-limiting example that at least a portion of the one or more rolling elements 142 of the parking pawl 118 may be in direct contact with at least a portion of the one or more protruding portions 116 of the cam 104 as the parking pawl 118 is transitioned from the disengaged position 106 to the first and/or second engagement portions 108 and/or 110.

A parking pawl pin aperture 144 may extend from a first side 146 to a second side 148 of the second end portion 136 of the parking pawl 118. The parking pawl pin aperture 144 may be of a size and shape to receive and/or retain at least a portion of a parking pawl pin 150 therein. The parking pawl pin 150 of the parking mechanism 100 may provide the parking pawl 118 with a pivot point allowing for the transition of the parking mechanism 100 between the disengaged position 106, the first engagement position 108, and/or the second engagement portion 110. At least a portion of an end of the parking pawl pin 150 opposite the parking pawl 118 may be integrally connected to or integrally formed as park of at least a portion of a drive unit housing, a parking mechanism housing, a transmission housing, a differential housing, a differential case, an inter-axle differential housing, a wheel end assembly, and/or a portion of a frame or a body of the vehicle.

A biasing member aperture 152 may extend from the first side 146 to the second side 148 of the intermediate portion 138 of the parking pawl 118 of the parking mechanism 100. The biasing member aperture 152 may be of a size and shape to receive and/or retain at least a portion of an end of one or more biasing members 154 therein. At least a portion of an end of the one or more biasing members 154 opposite the parking pawl 118 may be integrally connected to at least a portion of a drive unit housing, a parking mechanism housing, a transmission housing, a differential housing, a differential case, an inter-axle differential housing, a wheel end assembly, and/or a portion of a frame or a body of the vehicle. It is therefore to be understood that the one or more biasing members 154 may aid in ensuring that at least a portion of the parking pawl 118 is in direct contact with at least a portion of the cam 104 at all times. This aids in allowing the cam 104 to selectively transition the parking pawl 118 between the disengaged position 106, the first engagement position 108, and/or the second engagement position 110. As a non-limiting example that the one or more biasing members 154 may be one or more springs.

One or more parking pawl teeth 156 extend outward from at least a portion of the inner surface 130 of the first end portion 134 of the parking pawl 118. The one or more parking pawl teeth 156 of the parking pawl 118 are selectively engagable with at least a portion of the parking gear 120 when the parking mechanism 100 is in the first and/or second engagement positions 108 and/or 110 illustrated in FIGS. 3 and 4 of the disclosure. As a result, it is therefore to be understood that the one or more parking pawl teeth 156 of the parking pawl 118 are not engaged with the parking gear 120 when the parking mechanism 100 is in the disengaged position 106 illustrated in FIGS. 1 and 2 of the disclosure.

As best seen in FIG. 1 of the disclosure and as a non-limiting example, the cross-sectional profile of the one or more parking pawl teeth 156 of the parking pawl 118 may include a first substantially straight portion 158, a first transition portion 160, a second substantially straight portion 162, a second transition portion 164, and/or a third substantially straight portion 166. When the parking pawl 118 is in the first engaged position 108 illustrated in FIG. 3, at least a portion of the second substantially straight portion 162, the second transition portion 164, and/or the third substantially straight portion 166 of the one or more parking pawl teeth 156 may be in direct contact with at least a portion of the parking gear 120. Additionally, when the parking pawl 118 is in the second engaged position 110 illustrated in FIG. 4, at least a portion of the first substantially straight portion 158, the first transition portion 160, and/or the second substantially straight portion 162 of the one or more parking pawl teeth 156 may be in direct contact with at least a portion of the parking gear 120. It is within the scope of this disclosure and as a non-limiting example that the one or more parking pawl teeth 156 of the parking pawl 118 and the parking gear 120 may be designed such that the overall amount of surface area contact between the one or more parking pawl teeth 156 and the parking gear 120 is as small as possible. As a result, the resulting force vector between the parking gear teeth 174 and the parking pawl teeth 156 may be utilized to oppose the frictional forces on the parking pawl mechanism 100. This aids in reducing the overall amount of force needed to transition the parking pawl 118 from the first and/or second engaged position 108 and/or 110 to the disengaged position 106 described and illustrated herein. As a result, this aids in allowing the one or more actuation mechanisms 102 of the parking mechanism 100 to be smaller which reduces the overall weight, packaging size, and costs associated with the parking mechanism.

In accordance with the embodiment illustrated in FIG. 1 and as a non-limiting example, the first and third substantially straight portions 158 and 166 may be non-parallel to each other. It is therefore to be understand that the first and third substantially straight portions 158 and 166 of the one or more parking pawl teeth 156 may extend at an angle relative to each other. As a result, the distance between the first and third substantially straight portions 158 and 166 and therefore the thickness T1 of the one or more parking pawl teeth 156 as the first and third substantially straight portions 158 and 166 get further from a body portion 168 of the parking pawl 118 gets smaller. This aids in making it easier for the one or more parking pawl teeth 156 to selectively engage and disengage with the parking gear 120 of the parking mechanism 100 when in operation.

According to the embodiment illustrated in FIG. 1 of the disclosure and as a non-limiting example, the first and second transition portions 160 and 164 may be disposed on opposing ends of the second substantially straight portions 162 of the one or more parking pawl teeth 156. As a result, the first transition portion 160 provides a transition from the first substantially straight portion 158 to the second substantially straight portion 162 and the second transition portion 164 provides a transition from the second substantially straight portion 162 to the third substantially straight portion 166 of the one or more parking pawl teeth 156. The first and second transition portions 160 and 164 may aid in providing a smoother and/or easier engagement and disengagement of the parking pawl 118 with the parking gear 120 of the parking mechanism 100. It is within the scope of this disclosure and as a non-limiting example that the first and second transition portions 160 and 164 may have a substantially fillet shape, a substantially triangular cross-sectional shape, a substantially concave cross-sectional shape, a substantially arcuate cross-sectional shape, and/or substantially radiused in shape.

Figure 2:
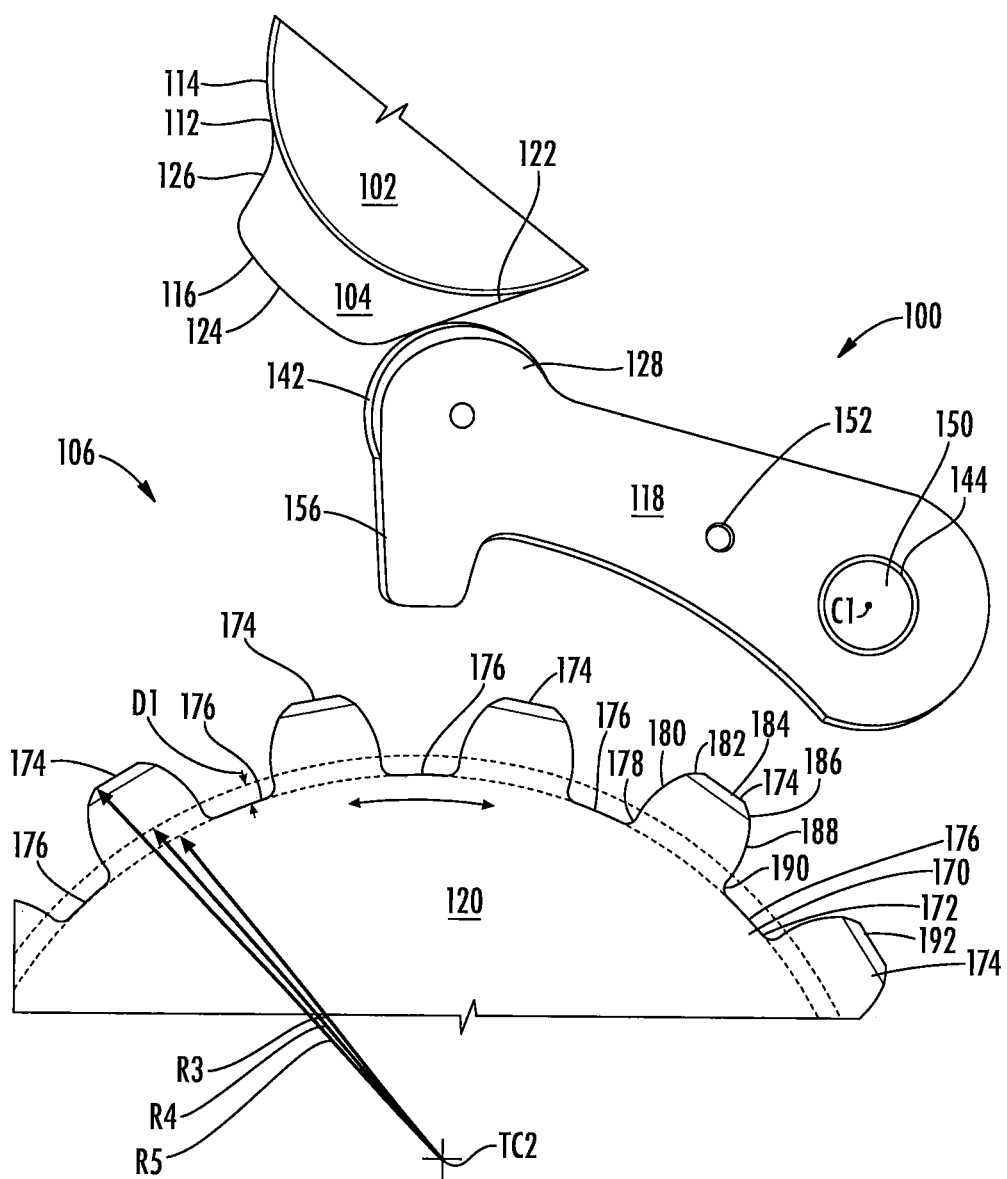
FIG. 2 is a schematic side-view of a portion of the parking mechanism illustrated in FIG. 1 where the parking mechanism is in a disengaged position.

As illustrated in FIG. 2 of the disclosure and as a non-limiting example, the parking gear 120 may include a body portion 170 having an outer surface 172 defined by a substantially continuous radius R3 from a theoretical center TC2 of the parking gear 120. The substantially continuous radius R3 of the body portion 170 provides the parking gear 120 with a root circle diameter.

One or more parking gear teeth 174 may circumferentially extend outward from at least a portion of the outer surface 172 of the body portion 170 of the parking gear 120. The space between the one or more parking gear teeth 174 defines one or more parking pawl tooth troughs 176 of the parking gear 120. The one or more parking pawl tooth troughs 176 may be of a size and shape to receive and/or retain at least a portion of the one or more parking pawl teeth 156 of the parking pawl 118 therein when the parking mechanism 100 is in the first and/or second engaged positions 108 and/or 110.

As best seen in FIG. 2 and as a non-limiting example, the one or more parking gear teeth 174 of the parking gear 120 may have a cross-sectional profile or shape that is defined by a first portion 178, a second portion 180, a third portion 182, a fourth portion 184, a fifth portion 186, a sixth portion 188, and/or a seventh portion 190. The first portion 178 and the seventh portion 190 of the cross-sectional profile or shape of the one or more parking gear teeth 174 may be disposed on opposing sides of the one or more parking gear teeth 174 and/or may be a mirror image of each other. Additionally, the second portion 180 and the sixth portion 188 of the cross-sectional profile or shape of the one or more parking gear teeth 174 may be disposed on opposing sides of the one or more parking gear teeth 174 and/or may be a mirror image of each other. Furthermore, third portion 182 and the fifth portion 186 of the cross-sectional profile or shape of the one or more parking gear teeth 174 may be disposed on opposing sides of the one or more parking gear teeth 174 and/or may be a mirror image of each other. According to the embodiment illustrated in FIG. 2 and as a non-limiting example, the fourth portion 184 of the cross-sectional profile or shape of the one or more parking gear teeth 174 may connect the third portion 182 to the fifth portion 186 of the cross-sectional profile or shape of the one or more parking gear teeth 174. As a result, it is therefore to be understood that the third portion 182 and the fifth portion 186 of the cross-sectional profile or shape of the one or more parking gear teeth 174 may be disposed at opposing ends of the fourth portion 184 of the cross-sectional profile or shape of the one or more parking gear teeth 174.

In accordance with the embodiment illustrated in FIG. 2 and as a non-limiting example, the first portion 178 and/or the seventh portion 190 of the cross-sectional profile or shape of the one or more parking gear teeth 174 may have a substantially fillet shape, a substantially arcuate shape, a substantially radiused shape, and/or a substantially concave shape. The first and/or seventh portions 178 and/or 190 of the cross-sectional profile or shape of the one or more parking gear teeth 174 may provide a transition from the one or more parking pawl tooth troughs 176 of the parking gear 120, the outer surface 172 of the body portion 170 of the parking gear 120, and/or the root circle diameter of the parking gear 120 to the one or more parking gear teeth 174. It is within the scope of this disclosure and as a non-limiting example that the first and/or third portions 178 and/or 190 of the cross-sectional profile or shape of the one or more parking gear teeth 174 may aid in improving the overall life and durability of the one or more parking gear teeth 174. This may be achieved by providing an improved overall distribution of the forces on the one or more parking gear teeth 174 at or near the outer surface 172 of the body portion 170 of the parking gear 120 when the parking mechanism 100 is in the first and/or second engagement positions 108 and/or 110.

According to the embodiment illustrated in FIG. 2 and as a non-limiting example, the second and/or sixth portions 180 and/or 188 of the cross-sectional profile or shape of the one or more parking gear teeth 174 may extend outward away from the first and/or seventh portions 178 and/or 190 of the cross-sectional profile or shape of the one or more parking gear teeth 174. As best seen in FIG. 2 and as a non-limiting example, the first and/or third portions 178 and/or 182 of the cross-sectional profile or shape of the one or more parking gear teeth 174 may be disposed on opposing ends of the second portion 180 of the cross-sectional profile or shape of the one or more parking gear teeth 174. Additionally, as best seen in FIG. 2 and as a non-limiting example, seventh and/or fifth portions 190 and/or 186 of the cross-sectional profile or shape of the one or more parking gear teeth 174 may be disposed on opposing ends of the sixth portion 188 of the cross-sectional profile or shape of the one or more parking gear teeth 174. It is within the scope of this disclosure and as a non-limiting example that the second and/or sixth portions 180 and/or 188 of the cross-sectional profile or shape of the one or more parking gear teeth 174 may be substantially linear and/or substantially arcuate in shape. As a non-limiting example, the second and/or sixth portions 180 and/or 188 of the cross-sectional profile or shape of the one or more parking gear teeth 174 may have a curved or arcuate shape that is obtained from or defined by another given curve. It is therefore within the scope of this disclosure and as a non-limiting example that the second and/or sixth portions 180 and/or 188 of the cross-sectional profile or shape of the one or more parking gear teeth 174 may have a substantially involute or a substantially evolvent shape that is derived from the base circle diameter of the parking gear 120.

The third and/or fifth portions 182 and/or 186 of the cross-sectional profile or shape of the one or more parking gear teeth 174 of the parking gear 120 may extend outward away from the body portion 170 of the parking gear 120. As best seen in FIG. 2 and as a non-limiting example, the first and/or fifth portions 182 and/or 186 of the one or more parking gear teeth 174 may extend from an end of the second and/or sixth portions 180 and/or 188 opposite the first and/or seventh portions 178 and/or 190 of the cross-sectional profile or shape of the one or more parking gear teeth 174. The third and/or fifth portions 182 and/or 186 of the one or more parking gear teeth 174 may provide a transition from the one or more parking pawl tooth troughs 176 of the parking gear 120 to an outermost surface 192 of the parking gear 120. It is within the scope of this disclosure and as a non-limiting example that the third and/or fifth portions 182 and/or 186 of the cross-sectional profile or shape of the one or more parking gear teeth 174 may be substantially linear and/or substantially convex in shape.

The fourth portion 184 of the cross-sectional profile or shape of the one or more parking gear teeth 174 may provide the outermost surface 192 of the parking gear 120 of the parking mechanism 100. At least a portion of the fourth portion 184 of the one or more parking gear teeth 174 may be disposed and/or may be defined by a radius R5 from the theoretical center TC2 of the parking mechanism 100. It is within the scope of this disclosure and as a non-limiting example that the fourth portion 184 of the one or more parking pawl teeth 120 may be substantially linear, substantially arcuate, substantially concave, and/or substantially convex in shape.

When the parking mechanism 100 is in the first engaged position 108, at least a portion of the one or more parking pawl teeth 156 of the parking pawl 118 may be in direct contact with at least a portion of the second portion 180 of the cross-sectional profile or shape of the one or more parking gear teeth 174. It is within the scope of this disclosure and as a non-limiting example that when in the first engaged position 108, at least a portion of the one or more parking pawl teeth 156 may be in direct contact with the second portion 180 of the one or more teeth 174 at or near the first portion 178 of the cross-sectional profile or shape of the one or more parking gear teeth 174. In accordance with the embodiment where the second portion 180 of the cross-sectional profile or shape of the one or more parking gear teeth 174 has a substantially involute or a substantially evolvent shape, an end portion nearest the first portion 178 may be substantially linear in shape. The substantially linear portion of the second portion 180 of the cross-sectional profile or shape of the one or more parking gear teeth 174 may provide a location where the parking pawl 118 may lockingly engage with and prevent rotation of the parking gear 120 of the parking mechanism 100. It is therefore within the scope of this disclosure and as a non-limiting example that when in the first engaged position 108, at least a portion of the one or more parking pawl teeth 156 may be in direct contact with the substantially linear portion of the second portion 180 of the one or more parking gear teeth 174. Additionally, it is within the scope of this disclosure and as a non-limiting example that when the parking mechanism 100 is in the first engaged position 108, at least a portion of the second transition portion 164 and/or the third substantially straight portion 166 of the one or more parking pawl teeth 156 may be in direct contact with at least a portion of the second portion 180 of the cross-sectional profile or shape of the one or more parking gear teeth 174.

Additionally, when the parking mechanism 100 is in the second engaged position 110, at least a portion of the one or more parking pawl teeth 156 of the parking pawl 118 may be in direct contact with at least a portion of the sixth portion 188 of the cross-sectional profile or shape of the one or more parking gear teeth 174. It is within the scope of this disclosure and as a non-limiting example that when in the second engaged position 110, at least a portion of the one or more parking pawl teeth 156 may be in direct contact with the sixth portion 188 of the one or more teeth 174 at or near the seventh portion 190 of the cross-sectional profile or shape of the one or more parking gear teeth 174. In accordance with the embodiment where the sixth portion 188 of the cross-sectional profile or shape of the one or more parking gear teeth 174 has a substantially involute or a substantially evolvent shape, an end portion nearest the seventh portion 190 may be substantially linear in shape. The substantially linear portion of the sixth portions 188 of the cross-sectional profile or shape of the one or more parking gear teeth 174 may provide a location where the parking pawl 118 may lockingly engage with and prevent rotation of the parking gear 120 of the parking mechanism 100. It is therefore within the scope of this disclosure and as a non-limiting example that when in the second engaged position 110, at least a portion of the one or more parking pawl teeth 156 may be in direct contact with the substantially linear portion of the sixth portion 188 of the one or more parking gear teeth 174. Additionally, it is within the scope of this disclosure and as a non-limiting example that when the parking mechanism 100 is in the second engaged position 110, at least a portion of the first substantially straight portion 158 and/or the first transition portion 160 of the one or more parking pawl teeth 156 may be in direct contact with at least a portion of the sixth portion 188 of the cross-sectional profile or shape of the one or more parking gear teeth 174.

The transition from the first portion 178 to the second portion 180 of the cross-sectional profile or shape of the one or more parking gear teeth 174 may be disposed a distance D1 from the outer surface 172 (or root circle diameter) of the body portion 170 of the parking gear 120. As best seen in FIG. 2 and as a non-limiting example, the transition from the first portion 178 to the second portion 180 (or the beginning of the second portion 180) of the cross-sectional profile or shape of the one or more parking gear teeth 174 may be disposed at a radius R4 from the theoretical enter TC2 of the parking gear 120. By altering the radius R4 defining the starting point of the second portion 180 of the cross-sectional profile or shape of the one or more parking gear teeth 174, a first force vector F1 of the parking mechanism 100 when in the first engaged position 108 may be altered. The substantially continuous radius R4 of the body portion 170 provides the parking gear 120 with a base circle diameter (or BCD).

Figure 3:
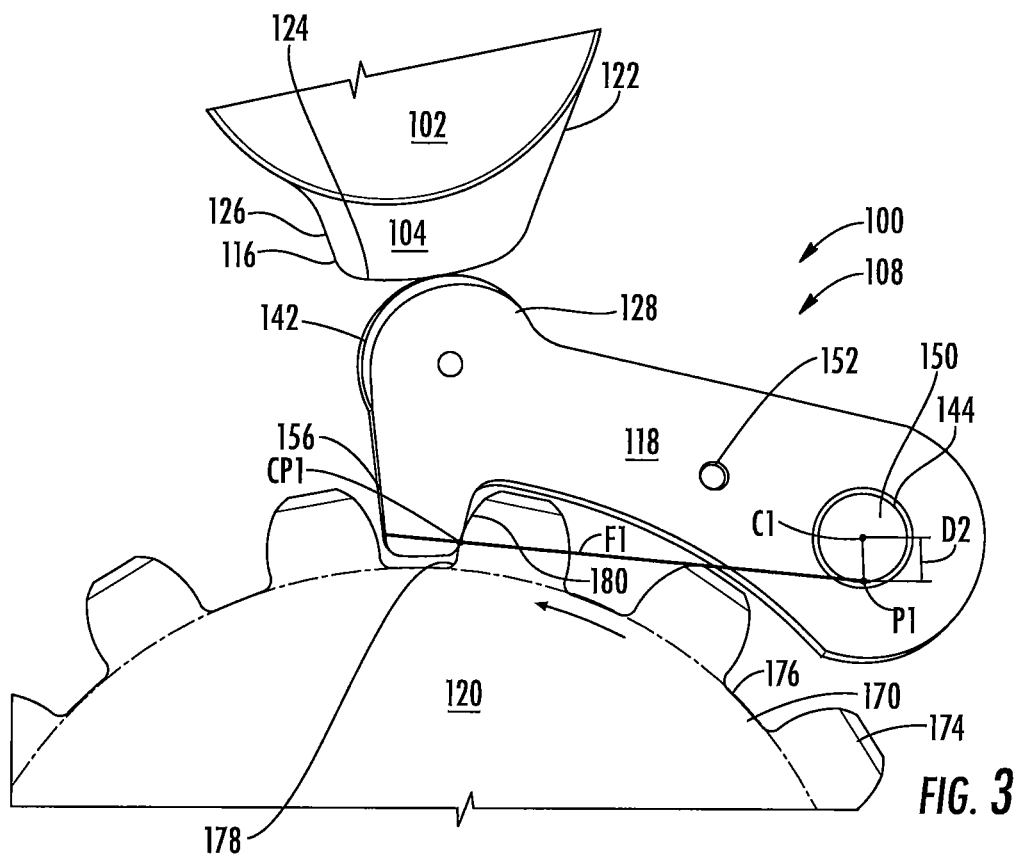
FIG. 3 is a schematic side-view of a portion of the parking mechanism illustrated in FIGS. 1 and 2 of the disclosure when the parking mechanism is in a first engaged position.

As best seen in FIG. 3 and as a non-limiting example, the first force vector F1 may extend from a first contact point CP1 between the one or more parking gear teeth 174 of the parking pawl 118 and the one or more parking gear teeth 156 of the parking gear 120 toward the parking pawl pin 150. The first force vector F1 of the parking mechanism 100 may be disposed a distance D2 from a center C1 of the parking pawl pin 150. The distance D2 may be measured from the center C1 of the parking pawl pin 150 to a first point P1 where the first force vector F1 extends through and/or first contacts the parking pawl pin 150 of the parking mechanism 100. In accordance with the embodiment illustrated in FIG. 3 and as a non-limiting example, when the parking mechanism 100 is in the first engaged position 108, the first force vector F1 may extend through at least a portion of the parking pawl pin 150 at a location below the center C1 of the parking pawl pin 150. By providing a parking mechanism 100 with a first force vector F1 that extends through the parking pawl pin 150, it minimizes the overall amount of forces that are translated from the parking gear 120, through the parking pawl 118, and into the cam 104 and/or the one or more actuation mechanisms 102 of the parking mechanism 100. This allows the parking mechanism 100 to operate with one or more actuation mechanisms 102 that have a smaller overall size and a reduced overall operational power. As a result, it is therefore to be understood that this aids in providing a parking mechanism 100 with an improved overall life, durability, and packaging size.

While the first force vector F1 illustrated in FIG. 3 when the parking mechanism 100 is in the first engaged position 108 extends below the center C1 of the parking pawl pin 150, it is within the scope of this disclosure that the first force vector F1 may extend above the center C1. This may be achieved by changing the contact point CP1 between the one or more parking pawl teeth 156 of the parking pawl 118 and the one or more gear teeth 174 of the parking gear 120 when the parking mechanism 100 is in the first engaged position 108.

By placing the contact point CP1 and CP2 when the parking mechanism 100 is in the first or second engagement position 108 or 110 at or near the BCD, the overall amount of forces translated to the cam 104 when in the first or second engaged position 108 or 110 is reduced. Additionally, by placing the contact point CP1 and CP2 at or near the BCD, the ejection force experienced by the parking pawl 118 is enough to quickly and efficiently drive the parking pawl 118 out of engagement with the parking gear 120 without causing damage to the parking pawl 118, the parking pawl pin 150, the cam 104 and/or the one or more actuation mechanism 102 of the parking mechanism 100.

It is within the scope of this disclosure and as a non-limiting example that the distances D2 and/or D3 from the center C1 of the parking pawl pin 150 may be altered. By altering the distances D2 and D3, the contact points CP1 and CP2 between the one or more parking pawl teeth 156 and the one or more parking gear teeth 174 may be changed. As a result, the distances D2 and D3, along with the contact points CP1 and CP2, may be altered in order to allow the same parking mechanism 100 to be used in a wide variety of vehicle applications, in a wide variety of vehicle locations, and on a wide variety of vehicle types and/or classes.

The transition of the seventh portion 190 to the sixth portion 188 of the cross-sectional profile or shape of the one or more parking gear teeth 174 may be disposed the distance D1 from the outer surface 172 (or root circle diameter) of the body portion 170 of the parking gear 120. As best seen in FIG. 2 and as a non-limiting example, the transition of the seventh portion 190 to the sixth portion 188 (or the beginning of the sixth portion 188) of the cross-sectional profile or shape of the one or more parking gear teeth 174 may be disposed at the radius R4 from the theoretical enter TC2. By providing one or more parking gear teeth 174 with a cross-sectional profile or shape where the transition of the first portion 178 to the second portion 180 and the transition of the seventh portion 190 to the sixth portion 188 are disposed along the same radius R4, it aids in ensuring that the parking mechanism 100 operates in the same way irrespective of the direction in which the parking gear 120 is rotated. Additionally, by altering the radius R4 defining the starting point of the sixth portion 188 of the cross-sectional profile or shape of the one or more parking gear teeth 174, a second force vector F2 of the parking mechanism 100 when in the second engaged position 110 may be altered.

Figure 4:
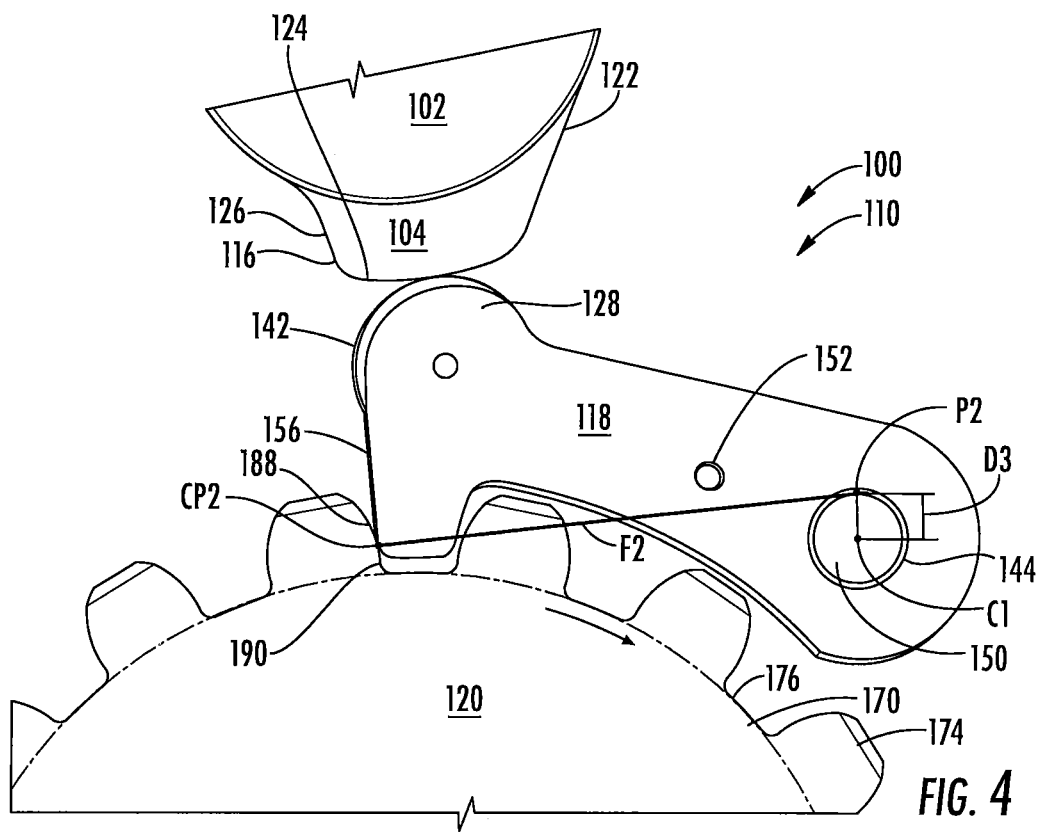
FIG. 4 is a schematic side-view of a portion of the parking mechanism illustrated in FIGS. 1-3 of the disclosure when the parking mechanism is in a second engaged position.

As best seen in FIG. 4 and as a non-limiting example, the second force vector F2 may extend from a second contact point CP2 between the one or more parking gear teeth 174 of the parking pawl 120 and the one or more parking gear teeth 156 of the parking gear 120 toward the parking pawl pin 150. The second force vector F2 of the parking mechanism 100 may be disposed a distance D3 from the center C1 of the parking pawl pin 150. The distance D3 may be measured from the center C1 of the parking pawl pin 150 to a second point P2 where the second force vector F2 extends through and/or first contacts the parking pawl pin 150 of the parking mechanism 100. In accordance with the embodiment illustrated in FIG. 4 of the disclosure and as a non-limiting example, when the parking mechanism 100 is in the second engaged position 110, the second force vector F2 may extend through at least a portion of the parking pawl pin 150 at a location above the center C1 of the parking pawl pin 150. By providing a parking mechanism 100 with a second force vector F2 that extends through the parking pawl pin 150, it minimizes the overall amount of forces that are translated from the parking gear 120, through the parking pawl 118, and into the cam 104 and/or the one or more actuation mechanisms 102 of the parking mechanism 100. This allows the parking mechanism 100 to operate with one or more actuation mechanisms 102 that have a smaller overall size and a reduced overall operational power. As a result, it is therefore to be understood that this aids in providing a parking mechanism 100 with an improved overall life, durability, and packaging size. It is within the scope of this disclosure and as a non-limiting example that the distance D2 may be equal to or substantially the same as the distance D3. Additionally, it is within the scope of this disclosure and as a non-limiting example that the distance D2 may be greater than or less than the distance D3 from the center C1 of the parking pawl pin 150 of the parking mechanism 100.

While the second force vector F2 illustrated in FIG. 4 when the parking mechanism 100 is in the second engaged position 110 extends above the center C1 of the parking pawl pin 150, it is within the scope of this disclosure that the second force vector F2 may extend below the center C1. This may be achieved by changing the contact point CP2 between the one or more parking pawl teeth 156 of the parking pawl 118 and the one or more gear teeth 174 of the parking gear 120 when the parking mechanism 100 is in the second engaged position 110.

As the parking mechanism 100 transitions from the first or second engaged position 108 or 110 to the disengaged position 106, an amount of energy stored within the one or more biasing members 154 may be used in order to drive the one or more parking pawl teeth 156 out of engagement with the one or more parking gear teeth 174. It is therefore within the scope of this disclosure and as a non-limiting example that the one or more biasing members 154 may be used in order to aid in transitioning the parking mechanism 100 from the first or second engaged position 108 or 110 to the disengaged position 106.

It is within the scope of this disclosure and as a non-limiting example that the second and/or sixth portions 180 and/or 188 of the cross-sectional profile or shape of the one or more parking gear teeth 174 may aid in ensuring that the parking pawl 118 disengages with the parking gear 120 without unintentionally locking-up or binding-up. It is within the scope of this disclosure and as a non-limiting example that the second and/or sixth portions 180 and/or 188 of the one or more teeth 174 may aid in driving the parking pawl 118 out of engagement with the parking gear 120 of the parking mechanism 100. As a result, it is therefore to be understood that the second and/or sixth portions 180 and/or 188 of the cross-sectional profile or shape of the one or more parking gear teeth 174 may aid in ensuring that the parking pawl 118 disengages with the parking gear 120 without unintentionally locking-up or binding-up. This aids in providing a parking mechanism 100 that is more reliable.

According to an embodiment of the disclosure and as a non-limiting example, as the parking mechanism 100 transitions from the first or second engagement position 108 or 110 to the disengagement position 106, the one or more parking pawl teeth 156 may translate outward along the length of the second and/or sixth portions 180 and/or 188 of the cross-sectional profile or shape of the one or more parking gear teeth 174. As the one or more parking pawl teeth 156 translate along the length of the second and/or sixth portions 180 and/or 188 of the cross-sectional profile or shape of the one or more parking gear teeth 174, the distance D2 or D3 from the center C1 of the parking pawl pin 150 increases. As the distance D2 or D3 increases, the pressure angle increases which results in an overall increase in the amount of ejection force that is translated from the parking gear 120 to the parking pawl 118. This aids in providing a parking mechanism 100 that is prevented from experiencing a lock-up or bound-up condition which may prevent the parking pawl 118 from disengaging from the parking gear 120 of the parking mechanism 100. By providing a parking mechanism 100 that does not experience a lock-up or bound-up condition, the one or more actuation mechanisms 102 are not used to pull or force the parking pawl 118 out of engagement with the parking gear 120. As a result, this allows for the parking mechanism to utilize one or more actuation mechanisms 102 having a smaller overall size and a reduced overall operational power which aids in providing a parking mechanism 100 with an improved overall life, durability, and packaging size.

In accordance with the embodiment wherein the second and/or sixth portions 180 and/or 188 of the cross-sectional profile or shape of the one or more parking gear teeth 174 have a substantially involute or a substantially evolvent shape, the end portion opposite the first and/or seventh 178 and/or 190 may have a substantially arcuate shape that becomes more arcuate as the second and/or sixth portions 180 transition toward the third and/or fifth portions 182 and/or 186. By providing the second and/or sixth portions 180 and/or 188 of the one or more teeth 174 with a substantially involute or a substantially evolvent shape, the parking gear 120 itself aids in driving the parking pawl 118 to the disengaged position 106 illustrated in FIGS. 1 and 2 of the disclosure. This aids in reducing the overall amount of force needed to transition the parking mechanism 100 from the first or second engagement position 108 or 110 to the disengaged position. Additionally, this aids in reducing the overall amount of friction between the parking pawl 118 and the parking gear 120 when the parking mechanism is in operation. This allows the parking mechanism 100 to operate with one or more actuation mechanisms 102 having a smaller overall size and a reduced overall operational power. As a result, it is therefore to be understood that this aids in providing a parking mechanism 100 with an improved overall life, durability, and packaging size.

As a result of this arrangement, the overall amount of forces on the vehicle (not shown) when in a parked condition, such as a hill stop condition, the higher the ejection forces that the parking mechanism 100 experiences. This aids in providing a parking mechanism 100 that does not experience a lock-up or bound-up condition where the parking pawl 118 is prevented from disengaging from the parking gear 120 when the vehicle (not shown) in is a condition such as a hill stop condition. As a result, the parking mechanism 100 described and illustrated herein, unlike conventional parking mechanisms, is prevented from and therefore will not experience a lock-up or bind-up condition even when the vehicle (not shown) is in extreme circumstances. This aids in providing a parking mechanism that is more reliable.

By providing a parking mechanism 100 with a cam 104, a parking pawl 118, and/or a parking gear 120 as described and illustrated herein, it aids in providing a parking mechanism 100 that does not experience a lock-up or binding condition, has a reduced packaging size, has a relatively small actuator or motor, has a reduced overall weight, that is easier to manufacturer, and has a reduced overall cost. Additionally, by providing a parking mechanism 100 with a cam 104, a parking pawl 118, and/or a parking gear 120 as described and illustrated herein, it aids in providing a single parking mechanism that is capable of being used in a wide variety of vehicle applications, in a wide variety of vehicle locations, and on a wide variety of vehicle types and/or classes.

Figure 5:
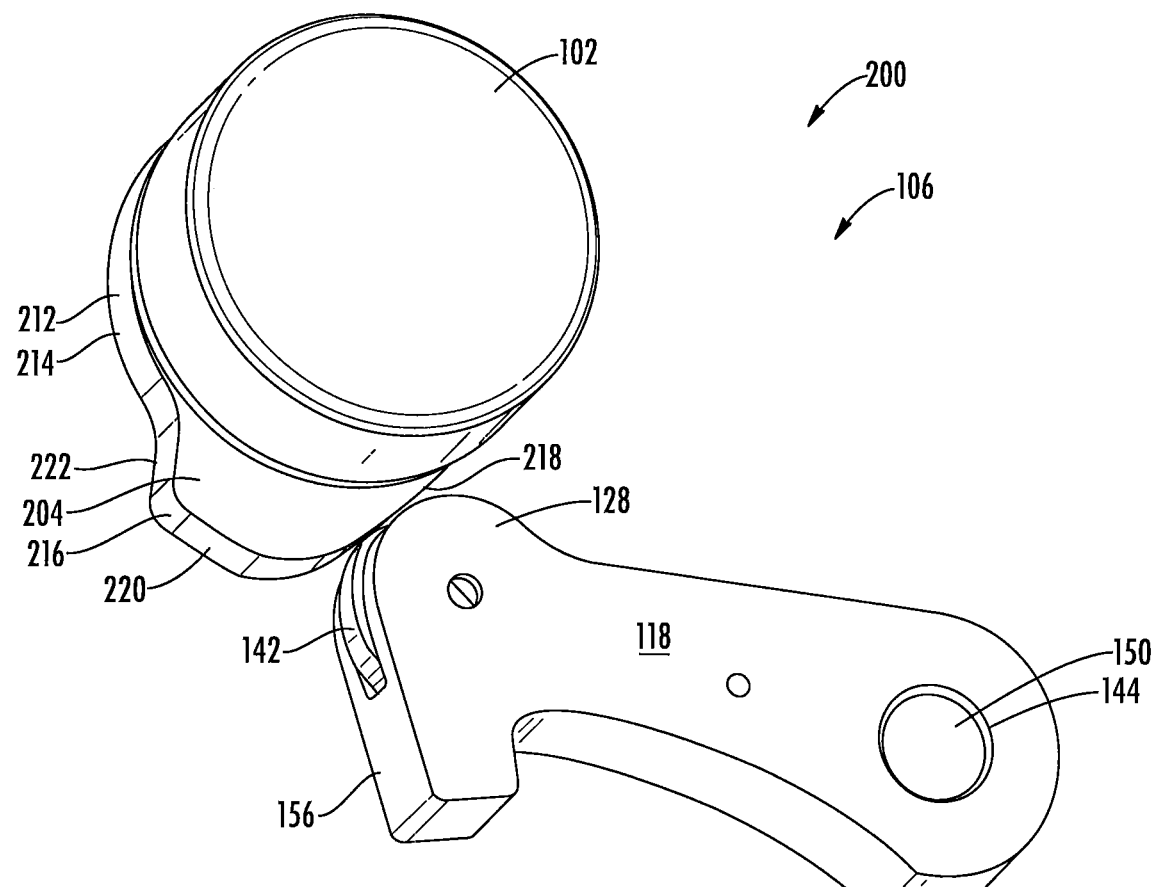
FIG. 5 is a schematic side-view of a portion of a parking marking mechanism having a cam according to an alternative embodiment of the disclosure.

FIG. 5 is a schematic illustration of a parking mechanism 200 having a cam 204 according to an alternative embodiment of the disclosure. The parking mechanism 200 and the cam 204 illustrated in FIG. 5 is the same as the parking mechanism 100 and the cam 104 illustrated in FIGS. 1-4, except where specifically noted below. In accordance with the embodiment illustrated in FIG. 5 of the disclosure and as a non-limiting example, the cam 204 may include a body portion 212 having an outer peripheral surface 214. The outer peripheral surface 214 of the body portion 212 of the cam 204 may be substantially cylindrical in shape. As a result, it is within the scope of this disclosure and as a non-limiting example that the substantially cylindrical shape of the outer periphery 214 of the body portion 212 of the cam 204 may be defined by a substantially continuous radius R6 (not shown) from a theoretical center TC3 (not shown) of the body portion 212 of the cam 204.

In accordance with the embodiment illustrated in FIG. 5 of the disclosure and as a non-limiting example, the one or more protruding portions 216 of the cam 204 may include a ramped portion 218, an engagement portion 220, and/or a transition portion 222. The ramped portion 218 of the one or more protruding portions 216 may extend outward from the outer periphery 214 of the body portion 212 of the cam 204 to an end of the engagement portion 220 opposite the transition portion 222 of the one or more protruding portions 216. As a head 128 of the parking pawl 118 transitions along the ramped portion 218, the head 128 of the parking pawl 118 is driven toward the parking gear 120 thereby selectively transitioning the parking mechanism 200 from the disengaged position 106 to the first and/or second engagement positions 108 and/or 110. It is within the scope of this disclosure and as a non-limiting example that the ramped portion 218 may have a substantially elliptical shape, arcuate shape, curved shape, and/or concave shape. By providing the cam 204 with a ramped portion 218 as described and illustrated herein, it aids in reducing the overall amount of torque required for the one or more actuation mechanisms 102 to selectively actuate and/or transition the cam 204 of the parking mechanism 200. As a result, this aids in reducing the overall amount of force needed to selectively transition the parking mechanism 200 between the disengaged position 106, the first engaged position 108, and/or the second engaged position 110.

As illustrated in FIG. 5 and as a non-limiting example, the engagement portion 220 of the one or more protruding portions 216 may be the outermost surface of the one or more protruding portions 216 of the cam 204. When the head 128 of the parking pawl 118 is in contact with the engagement portion 220 of the one or more protruding portions 216, the parking pawl 118 may be in the first and/or second engagement portion 108 and/or 110 or may be in a blocked condition (not shown). It is within the scope of this disclosure and as a non-limiting example that the engagement portion 220 may be substantially arcuate in shape. As a non-limiting example, the engagement portion 220 of the one or more protruding portions 216 may be defined by a substantially constant radius R6 (not shown) from the theoretical center TC3 (not shown) of the cam 204 of the parking mechanism 200. By providing the engagement portion 220 of the one or more protruding portions 216 with the substantially continuous radius R6 (not shown), it aids in ensuring that the parking pawl 118 remains in substantially the same position at all times when the parking mechanism 200 is in the first and/or second engagement portions 108 and/or 110.

The transition portion 222 of the one or more protruding portions 216 of the cam 204 extends inward from an end of the engagement portion 220 opposite the ramped portion 218. The end of the transition portion 222, opposite the engagement portion 220, connects the one or more protruding portions 216 to the outer peripheral surface 214 of the body portion 212 of the cam 204. As the head 128 of the parking pawl 118 transitions along the transition portion 222, the parking pawl 118 is allowed to transition from the first and/or second engagement positions 108 and/or 110 to the disengagement position 106.

In accordance with an alternative embodiment of the disclosure and as a non-limiting example, the cam 204 may be driven in a reverse direction by the one or more actuation mechanisms 102 in order to selectively transition the parking mechanism 200 from the first and/or second engagement positions 108 and/or 110 to the disengagement position 106. The reverse direction may be defined as the direction opposite the direction needed to transition the parking mechanism 200 from the disengaged position 106 to the first and/or second engagement positions 108 and/or 110. According to this embodiment of the disclosure and as a non-limiting example, the head 128 of the parking pawl 118 may be allowed to transition from the engagement portion 220 down the ramped portion 218 of the one or more protruding portions 216. As the head 128 of the parking pawl 118 transitions along the ramped portion 218 of the cam 204, the parking mechanism 200 is selectively transitioned from the first and/or second engagement positions 108 and/or 110 to the disengaged position 106 described and illustrated herein.

By providing a parking mechanism 200 with a cam 204, a parking pawl 118, and/or a parking gear 120 as described and illustrated herein, it aids in providing a parking mechanism that does not experience a lock-up or binding condition, has a reduced packaging size, has a relatively small actuator or motor, has a reduced overall weight, that is easier to manufacturer, and has a reduced overall cost. Additionally, by providing a parking mechanism 200 with a cam 204, a parking pawl 118, and/or a parking gear 120 as described and illustrated herein, it aids in providing a single parking mechanism that is capable of being used in a wide variety of vehicle applications, in a wide variety of vehicle locations, and on a wide variety of vehicle types and/or classes.

FIG. 6 is a flow chart illustrating a method 300 of operating or using the parking mechanism 100 and/or 200 described and illustrated herein. As illustrated in FIG. 6 of the disclosure and as a non-limiting example, the method 300 includes providing 302 a parking mechanism 100 and/or 200 having one or more actuators 102, a cam 104 and/or 204, a parking pawl 120, and/or a parking pawl 118. It is within the scope of this disclosure and as a non-limiting example that the parking gear 120 may include one or more parking gear teeth 174 and the parking pawl 118 may include one or more parking pawl teeth 156 as described and illustrated herein.

Once the parking mechanism 100 and/or 200 has been provided 302, an amount of ejection force needed and/or desired for the parking mechanism 100 and/or 102 may be identified 304. The ejection force identified 304 may be of an amount needed in order to ensure that the parking pawl 118 is quickly and efficiently without experiencing a lock-up or bind-up condition preventing the parking pawl 118 from transitioning from the first or second engaged position 108 or 110 to the disengaged position 106. Additionally, the amount of ejection force identified may be an amount needed to transition the parking pawl 118 from the first or second engaged position 108 or 110 to the disengaged position 106, without transmitting an undesirable amount of force to the cam 104 and/or 204, the parking pawl 118, the parking pawl pin 150, and/or the one or more actuation mechanisms 102. This aids in providing a parking mechanism 100 and/or 200 that is more reliable and has an increased overall life and durability.

After the amount of ejection force desired for the parking mechanism 100 and/or 200 has been identified 304, a determination step 305 may be performed. During the determination step 305, a first contact point CP1, a second contact point CP2, a first force vector F1, and/or a second force vector F2 may be determined 306, 310, 308, and 312 respectively. As previously described and illustrated herein, the first and second contact points CP1 and CP2 are the points where the one or more parking pawl teeth 156 engage or contact the one or more parking gear teeth 174 when the parking mechanism 100 and/or 200 is in a first and second engaged position 108 and 110 respectively. Additionally, as previously described and illustrated herein, the first and second force vectors F1 and F2 may extend from the first and second contact points CP1 and CP2 toward the parking pawl pin 150 when the parking mechanism 100 and/or 200 is in the first and second engaged positions 108 and 110.

Once the determination step 305 has been completed, the distance D2, the distance D3, the first force vector F1, the second force vector F2, the first contact point CP1, and/or the second contact point CP2 may be altered 314. As previously described herein, the distances D2 and D3 may be measured from the center C1 of the parking pawl pin 150 to the first and second points P1 and P2 where the first and second force vectors F1 and F2 extend through or contact the parking pawl pin 150 of the parking mechanism 100 and/or 200. By altering 314 the distance D2, the distance D3, the first force vector F1, the second force vector F2, the first contact point CP1, and/or the second contact point CP2, the amount of forces translated from the parking gear 120 to the cam 104 and/or 204, the one or more actuation mechanisms 102 may be reduced. Additionally, by altering 314 the distance D2, the distance D3, the first force vector F1, the second force vector F2, the first contact point CP1, and/or the second contact point CP2, the ejection force may be of an amount needed to prevent a locking-up or binding-up condition that will prevent the parking pawl 118 from disengaging with the parking gear 120. This aids in providing a parking mechanism 100 and/or 200 that does not experience a lock-up or binding condition, has a reduced packaging size, has a relatively small actuator or motor, has a reduced overall weight, that is easier to manufacturer, and has a reduced overall cost. Additionally, this aids in providing a single parking mechanism 100 and/or 200 that is capable of being used in a wide variety of vehicle applications, in a wide variety of vehicle locations, and on a wide variety of vehicle types and/or classes.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A parking mechanism, comprising:
   one or more actuation mechanisms drivingly connected to at least a portion of a cam;
   a parking pawl having a first end portion and a second end portion with one or more parking pawl teeth extending outward from at least a portion of an inner surface of said first end portion;
      wherein said second end portion of said parking pawl has a parking pawl pin aperture having a size and shape to receive and/or retain at least a portion of a parking pawl pin therein; and
      wherein said first end portion of said parking pawl includes a rolling element extending from an outer surface of said first end portion and engageable with at least a portion of said cam; and
   a parking gear having one or more parking gear teeth extending outward from at least a portion of a body portion with an outer surface;
   wherein at least a portion of said one or more parking pawl teeth of said parking pawl are selectively engagable with at least a portion of said one or more parking gear teeth;
   wherein said parking mechanism has a first engaged position and a second engaged position;
   wherein, in said first engaged position, at least a portion of said one or more parking pawl teeth are engaged with at least a portion of a portion of said parking gear teeth having a substantially involute or a substantially evolvent shape that is derived from a base circle diameter of said parking gear; and
   wherein, in said second engaged position, at least a portion of said one or more parking pawl teeth are engaged with at least a portion of an additional portion of said parking gear teeth having a substantially involute or a substantially evolvent shape that is derived from said base circle diameter of said parking gear.

2. The parking mechanism of claim 1, wherein said one or more actuation mechanisms are one or more actuators, one or more electric motors, one or more pneumatic actuators, and/or one or more hydraulic actuators.

3. The parking mechanism of claim 1, wherein said parking mechanism has a disengaged position;
   wherein, in said disengaged position, said parking pawl is not engaged with said parking gear;
   wherein, in said first engaged position, said parking mechanism has a first force vector; and
   wherein, in said second engaged position, said parking mechanism has a second force vector.

4. The parking mechanism of claim 3, wherein said first force vector of said parking mechanism extends from a first contact point between said one or more parking gear teeth of said parking pawl and said one or more parking gear teeth of said parking gear toward said parking pawl pin; and wherein said second force vector of said parking mechanism extends from a second contact point between said one or more parking gear teeth of said parking pawl and said one or more parking gear teeth of said parking gear toward said parking pawl pin.

5. The parking mechanism of claim 3, wherein said first force vector of said parking mechanism is disposed a distance D2 from a center C1 of said parking pawl pin and wherein said second force vector of said parking mechanism is disposed a distance D3 from said center C1 of said parking pawl pin;

wherein said distance D2 is measured from said center C1 of said parking pawl pin to a first point P1 where said first force vector extends through said parking pawl pin; and wherein said distance D3 is measured from said center C1 of said parking pawl pin to a second point P2 where said second force vector extends through said parking pawl pin.

6. The parking mechanism of claim 5, wherein said distance D2 is substantially equal to said distance D3.

7. The parking mechanism of claim 3, wherein said first force vector of said parking mechanism extends above a center C1 of said parking pawl pin; and wherein said second force vector of said parking mechanism extends below said center C1 of said parking pawl pin.

8. The parking mechanism of claim 1, wherein said one or more parking gear teeth of said parking gear have a cross-sectional profile or shape comprising, in order, a first portion, a second portion, a third portion, a fourth portion, a fifth portion, a sixth portion, and/or a seventh portion;

wherein said second portion and said sixth portion of said cross-sectional profile or shape of said one or more parking gear teeth extend outward away from said body portion of said parking gear from an end of said first portion and said seventh portion of said cross-sectional profile or shape of said one or more parking gear teeth respectively; and wherein said second portion and said sixth portion of said cross-sectional profile or shape of said one or more parking gear teeth have a substantially involute or a substantially evolvent shape that is derived from said base circle diameter of said parking gear.

9. The parking mechanism of claim 1, wherein said one or more parking gear teeth of said parking gear have a cross-sectional profile or shape comprising, in order, a first portion, a second portion, a third portion, a fourth portion, a fifth portion, a sixth portion, and/or a seventh portion;

wherein a transition of said first portion to said second portion and a transition from said seventh portion to said sixth portion of said cross-sectional profile or shape of said one or more parking gear teeth are disposed along a substantially continuous radius R4 from a theoretical center TC2 of said parking gear, wherein said radius R4 defines the base circle diameter of the parking gear.

10. The parking mechanism of claim 9, wherein said radius R4 is larger than a radius R3 of said outer surface of said body portion of said parking gear defining a root circle diameter of said parking gear.

11. The parking mechanism of claim 1, wherein said one or more parking pawl teeth of said parking pawl have a cross-sectional profile or shape comprising a first substantially straight portion, a first transition portion, a second substantially straight portion, a second transition portion, and/or a third substantially straight portion.

12. The parking mechanism of claim 11, wherein, in said first engaged position, at least a portion of said second transition portion and/or said third substantially straight portion of said cross-sectional profile or shape of said one or more parking pawl teeth are in direct contact with at least a portion of a portion of said one or more parking gear teeth having a substantially involute or a substantially evolvent shape that is derived from said base circle diameter of said parking gear; and wherein, in said second engaged position, at least a portion of said first substantially straight portion and/or said first transition portion of said cross-sectional profile or shape of said one or more parking pawl teeth are in direct contact with at least a portion of an additional portion of said one or more parking gear teeth having a substantially involute or a substantially evolvent shape that is derived from said base circle diameter of said parking gear.

13. A parking mechanism, comprising:

one or more actuation mechanisms drivingly connected to at least a portion of a cam;

a parking pawl having a first end portion and a second end portion with one or more parking pawl teeth extending outward from at least a portion of an inner surface of said first end portion;

wherein said second end portion of said parking pawl has a parking pawl pin aperture having a size and shape to receive and/or retain at least a portion of a parking pawl pin therein; and wherein said first end portion of said parking pawl includes a rolling element extending from an outer surface of said first end portion and engageable with at least a portion of said cam; and a parking gear having one or more parking gear teeth extending outward from at least a portion of a body portion with an outer surface;

wherein at least a portion of said one or more parking pawl teeth of said parking pawl are selectively engageable with at least a portion of said one or more parking gear teeth;

wherein said one or more parking gear teeth of said parking gear have a cross-sectional profile or shape comprising, in order, a first portion, a second portion, a third portion, a fourth portion, a fifth portion, a sixth portion, and/or a seventh portions;

wherein said first portion and said seventh portion of said cross-sectional profile or shape of said one or more parking gear teeth of said parking gear extend outward away from said outer surface of said body portion of said parking gear; and wherein said first portion and said seventh portion of said cross-sectional profile or shape of said one or more parking gear teeth have a substantially fillet shape, a substantially arcuate shape, a substantially radiused shape, and/or a substantially concave shape.

14. The parking mechanism of claim 13, wherein said parking mechanism has a first engaged position and a second engaged position;

wherein said second portion and said sixth portion of said cross-sectional shape or profile of said one or more parking gear teeth have a substantially evolvent shape that is derived from base circle diameter of said parking gear;

wherein, in said first engaged position, at least a portion of said one or more parking pawl teeth of said parking pawl are engaged with at least a portion of said second portion of said cross-sectional profile or shape of said one or more parking gear teeth at a location at or near a transition from said first portion to said second portion of said cross-sectional profile or shape of said one or more parking gear teeth; and wherein, in said second engaged position, at least a portion of said one or more parking pawl teeth are engaged with at least a portion of said sixth portion of said cross-sectional profile or shape of said one or more parking gear teeth at a location at or near a transition from said seventh portion to said sixth portion of said cross-sectional profile or shape of said one or more parking gear teeth.

15. The parking mechanism of claim 13, wherein said parking mechanism has a first engaged position and a second engaged position;

wherein, in said first engaged position, at least a portion of said one or more parking pawl teeth of said parking pawl are engaged with at least a portion of a portion of said cross-sectional profile or shape of said one or more parking gear teeth having a substantially involute or a substantially evolvent shape at a location near said body portion of said parking gear; and wherein, in said second engaged position, at least a portion of said one or more parking pawl teeth of said parking pawl are engaged with at least a portion of an additional portion of said cross-sectional profile or shape of said one or more parking gear teeth having a substantially involute or a substantially evolvent shape at a location near said body portion of said parking gear.

16. A method of making a parking mechanism for a vehicle, the parking mechanism including one or more actuation mechanisms, a cam, a parking pawl having one or more parking pawl teeth, a parking pawl pin, and/or a parking gear having one or more parking gear teeth;

wherein the method comprises:
identifying an amount of ejection force for said parking mechanism;
determining a first contact point between said one or more parking pawl teeth and said one or more parking gear teeth in a first engaged position,
determining a first force vector for the parking mechanism when in the first engaged position,
determining a second contact point between said one or more parking pawl teeth and said one or more parking gear teeth in a second engaged position,
determining a second force vector for the parking mechanism when in the second engaged position,
determining a base circle diameter, a distance D2 from a center of the parking pawl pin to a first point, and/or a distance D3 from the center of the parking pawl pin to a second point, wherein said first force vector extends from said first contact point toward said parking pin, and wherein said second force vector extends from said second contact point toward said parking pawl pin; and
altering the distance D2, the distance D3, the first force vector, the second force vector, the first contact point, and/or the second contact point to achieve the identified amount of ejection force for the parking mechanism.

* * * * *